April 27, 1965    J. C. WASILEWSKI ET AL    3,180,527
AIR-OPERATED BURETTE
Filed Oct. 29, 1962    3 Sheets-Sheet 1
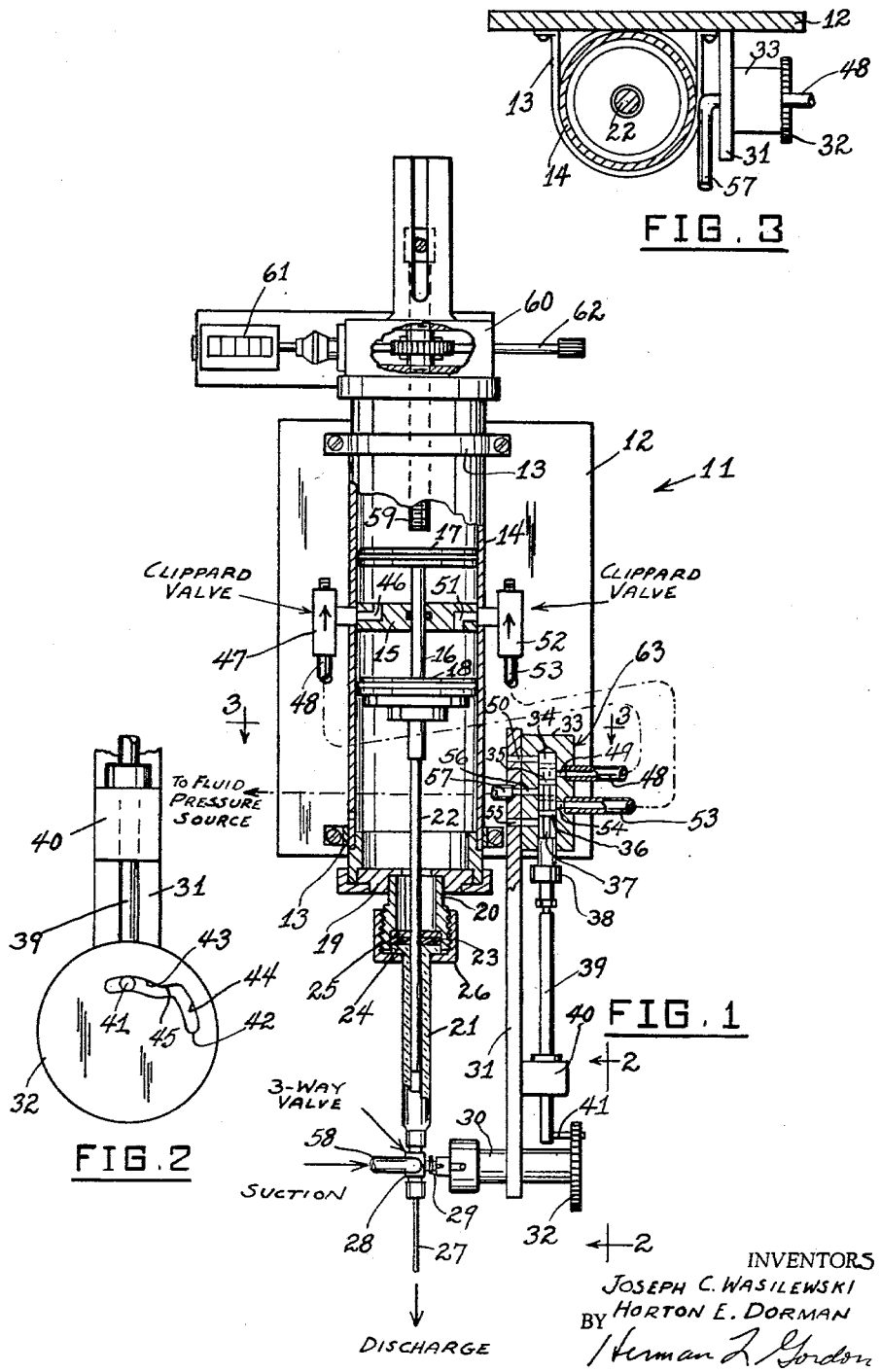
INVENTORS
JOSEPH C. WASILEWSKI
HORTON E. DORMAN
BY
ATTORNEY

United States Patent Office 3,180,527
Patented Apr. 27, 1965

3,180,527
AIR-OPERATED BURETTE
Joseph C. Wasilewski and Horton E. Dorman, Silver Spring, Md., assignors to American Instrument Co., Inc., Silver Spring, Md.
Filed Oct. 29, 1962, Ser. No. 233,548
13 Claims. (Cl. 222—70)

This invention relates to fluid dispensing devices, and more particularly to a fluid pressure-operated burette which may be employed to dispense accurately measured volumetric quantities of fluids.

A main object of the invention is to provide a novel and improved burette device which is relatively simple in construction, which is easy to operate, and which can be adjusted to dispense an accurately known quantity of a fluid.

A further object of the invention is to provide an improved fluid pressure-operated burette device which involves relatively few parts, which is easy to calibrate, and which permits the measured dispensing of small quantities of fluid materials, thus permitting accurate and precise micro-titration techniques and similar operations to be performed thereby.

A still further object of the invention is to provide an improved burette apparatus which is inexpensive to manufacture, which is relatively compact in size, which is durable in construction, and which is readily adaptable for use as a pump or in a timed or programmed manner.

A still further object of the invention is to provide an improved fluid pressure-operated burette device suitable for use with either liquids or gases and wherein accurately measured quantities of the fluid being handled may be dispensed, the device being especially adaptable for use in such processes as vial filling of chemicals, pharmaceuticals, or other liquid reagents which have to be performed precisely, accurately, and at a rapid rate, or in other chemical applications where controlled accurate volumes are required.

A still further object of the invention is to provide an improved burette device for use in a chemical laboratory, where a chemist might be required to dispense reagents very accurately, precisely and conveniently, and wherein the dispensed volumes can be adjusted by simply setting a digital display counter to the required volumes, the apparatus being particularly applicable for preparing standardized reagents, for dilution purposes, and as a titrating device for checking the concentrations of prepared reagents, for example, in conjunction with colorimeters, spectro-photometers, pH meters, or conductivity bridges.

A still further object of the invention is to provide an improved burette device which may be used in a closed system to safely and accurately dispense corrosive, inert, or other fluids, and which is particularly useful in handling radioactive or toxic materials, and in other applications where remote control of the apparatus is desirable.

Further objects and advantages of the invention will become apparent from the following descriptions and claims, and from the accompanying drawings, wherein:

FIGURE 1 is a front elevational view, partly in vertical cross-section, of an improved burette apparatus constructed in accordance with the present invention.

FIGURE 2 is an enlarged fragmentary side elevational view taken substantially on line 2—2 of FIGURE 1.

FIGURE 3 is a horizontal cross-sectional view taken on line 3—3 of FIGURE 1.

Figure 4:
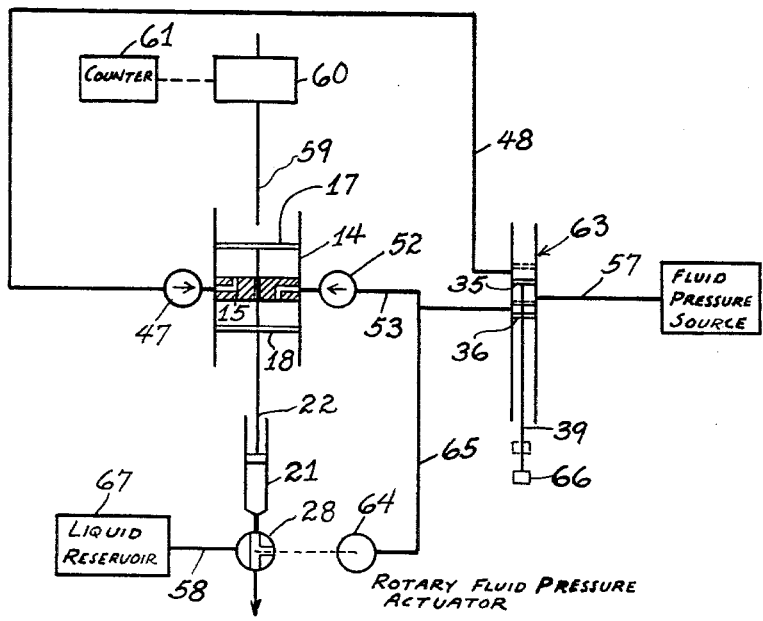
FIGURE 4 is a diagrammatic view of a modified form of fluid pressure-operated burette device according to the present invention.

Referring to the drawings, and more particularly to FIGURES 1, 2 and 3, 11 generally designates an air-operated burette assembly constructed in accordance with the present invention. The assembly 11 comprises a supporting plate 12 adapted to be mounted vertically in any suitable manner. Secured vertically on plate 12 by a pair of clamping straps 13, 13 is a cylinder 14 provided with an intermediate partition wall 15 rigidly secured therein. A piston rod 16 extends slidably and sealingly through the center of partition wall 15. Secured to the top end of piston rod 16 is the upper piston 17 which is sealingly slidable in the upper portion of main cylinder 14, which is suitably vented at its top end. Secured to the bottom end of rod 16 is the lower piston 18 which is sealingly slidable in the lower portion of main cylinder 14, which is suitably vented at its lower end.

Main cylinder 14 is provided with the bottom wall 19 to which is axially secured the depending conduit 20. A depending glass syringe barrel 21 is axially connected to the bottom end of conduit 20. Rigidly connected to the center of the lower piston 18 is the depending plunger rod 22 which extends sealingly and slidably into the syringe barrel 21, said rod being operated by the vertical movement of the pistons 17 and 18 in a manner presently to be described.

As shown in FIGURE 1, the plunger rod 22 extends sealingly and slidably through an annular sealing gasket 23 interposed between the top flange 24 of syringe barrel 21 and a washer 25, the members 25, 23 and 24 being received in an enlarged bore portion provided in the lower end of conduit 20 and being clamped therein by an annular cup-shaped nut member 26 threadedly engaged on the lower portion of conduit 20.

Syringe barrel 21 is provided at its lower end with the capillary discharge tube 27 which communicates with the barrel through a conventional rotary 3-way valve 28 having a horizontal operating shaft 29. Shaft 29 is drivingly coupled to a horizontal shaft member 30 which is rotatably mounted in a vertical bracket plate 31 rigidly secured to and depending from the main supporting plate 12.

Axially secured to the end of shaft member 30 is the knurled operating disc member 32.

Rigidly mounted on the upper portion of plate 31 substantially in vertical alignment with shaft 30 is a valve block 33 formed with the vertical bore 34 in which a pair of spaced valve pistons 35 and 36 are slidably and sealingly disposed. Pistons 35 and 36 are mounted on a common piston rod 37 integrally formed on a flanged sealing plug 38 which is sealingly slidable in the bottom portion of bore 34. Connected to the sealing plug and depending therefrom is a vertical connecting rod 39 which extends slidably through a guide block 40 rigidly secured on plate 31. Rod 39 is provided at its lower end with a laterally projecting pin member 41 which extends transversely through a cam slot 42 formed in disc member 32.

Cam slot 42 comprises the radially offset concentric arcuate end portions 43 and 44 connected by the intermediate slot offset 45, as shown in FIGURE 2. When disc 32 is in the position illustrated in FIGURE 2, with pin 41 engaged in slot portion 43, the pistons 35 and 36 are in their full-line positions shown in FIGURE 1. When disc 32 is rotated counterclockwise, as viewed in FIGURE 2, to cause pin 41 to enter slot portion 44, the pistons 35 and 36 are elevated to their dotted view positions in FIGURE 1.

Partition member 15 is formed with a first passage 46 opening into the space thereabove and connected through a Clippard check valve 47 and a conduit 48 to a passage 49 in valve block 33 leading to the space between the upper and lower positions of piston 35. When the piston 35 is in its lower position, shown in full line view in FIGURE 1, this space is vented to atmosphere by a vent passage 50.

Partition member 15 is formed with a second passage 51 opening into the space therebelow and connected through a Clippard check valve 52 and a conduit 53 to a passage 54 in valve block 33 leading to the space between the upper and lower positions of piston 36. When the piston 36 is in its upper position, this space is vented to atmosphere by a vent passage 55.

A passage 56 leading to the space between pistons 35 and 36 is connected by a conduit 57 to a suitable fluid pressure source, for example, a tank of compressed air.

The Clippard check valves 47 and 52 are of a type providing adjustable restricted flow in one direction, namely, the direction of the arrows in FIGURE 1, and unrestricted free flow in the opposite direction. These valves are similar to Clippard Model MFC-1, made by Clippard Instrument Laboratory, Inc., 7390 Colerain Road, Cincinnati 39, Ohio.

Thus, with the parts in the positions shown in full line view in FIGURE 1, compressed air passes through conduit 53, check valve 52 and passage 51 at a restricted rate into the space below partition 15 and exerts downward force on piston 18. Fluid in the space above partition 15 is allowed to discharge freely through passage 46, check valve 47, conduit 48 and vent passage 50. In this position of the parts, 3-way valve 28 is in a position communicatively connecting syringe barrel 21 with the discharge capillary tube 27.

The force on piston 18 thus moves the plunger 22 downwardly and causes fluid in the lower portion of barrel 21 to discharge through the capillary tube 27.

When disc 32 is rotated counterclockwise from the position of FIGURE 2 to cause pin 41 to engage in the slot portion 44, valve pistons 35 and 36 are elevated to their dotted view positions in FIGURE 1. Compressed air then passes at a restricted rate through conduit 48, Clippard valve 47 and passage 46 into the space above partition 15, exerting upward force on piston 17. Fluid in the space below partition 15 is allowed to discharge freely through passage 51, Clippard valve 52, conduit 53 and vent passage 55. In this position of disc 32, 3-way valve 28 is in a position to communicatively connect syringe barrel 21 to an intake conduit 58 leading to a supply reservoir containing fluid to be dispensed. The suction produced by the upward movement of plunger rod 22 in barrel 21 draws a quantity of fluid into the barrel, determined by the permitted upward movement of piston 17. The upward movement of piston 17 is limited by its engagement with the bottom end of an adjustable stop screw 59, whose position is preset by an adjusting mechanism 60 similar to that shown in U.S. Patent No. 2,925,198 to S. Healey, and which includes an indicating counter 61. In the arrangement illustrated in FIGURE 1, the adjusting mechanism is provided with a manually operated adjusting shaft 62, which enables stop screw 59 to be manually set to a position corresponding to a desired volumetric quantity to be drawn into the syringe barrel 21, and indicated by the counter 61.

The measured quantity of fluid can then be discharged through the tube 27 by manually rotating the disc 32 to the discharge position shown in FIGURE 2, providing the discharge action above described.

The double-piston valve assembly comprising the block 33 and pistons 35 and 36 is designated generally at 63 and may comprise a valve assembly similar to Model MAV-4 made by Clippard Instrument Laboratory, Inc., above mentioned.

Instead of employing a mechanical linkage between 3-way valve 28 and valve control rod 39 of valve 63, the 3-way valve 28 may be operated by a rotary fluid pressure driving device 64, as shown in FIGURE 4, for example, a device similar to Rotary Air Actuator, Series 50, made by Leedex, Inc., Dayton, Ohio. In this arrangement, the actuator is connected by a conduit 65 to the air line 53 and the control rod 39 is provided with an operating push button 66 for manual actuation. In the position shown in FIGURE 4, the fluid pressure signal producing downward discharge movement of piston 18 also operates actuator 64 to operate the 3-way valve 28 to fluid dispensing position. When conduit 65 is vented, by actuating push button 66 to elevate pistons 35 and 36 to their dotted view positions in FIGURE 4, actuator 64 returns to its normal position and connects syringe barrel 21 to the liquid reservoir, shown at 67. At the same time, the upper piston 17 is moved upwardly, causing the plunger 22 to move upwardly in barrel 21 and to draw a new charge of liquid from reservoir 67 into the syringe barrel. The liquid is dispensed when valve operating rod 39 is returned to its full line position in FIGURE 4.

Figure 5:
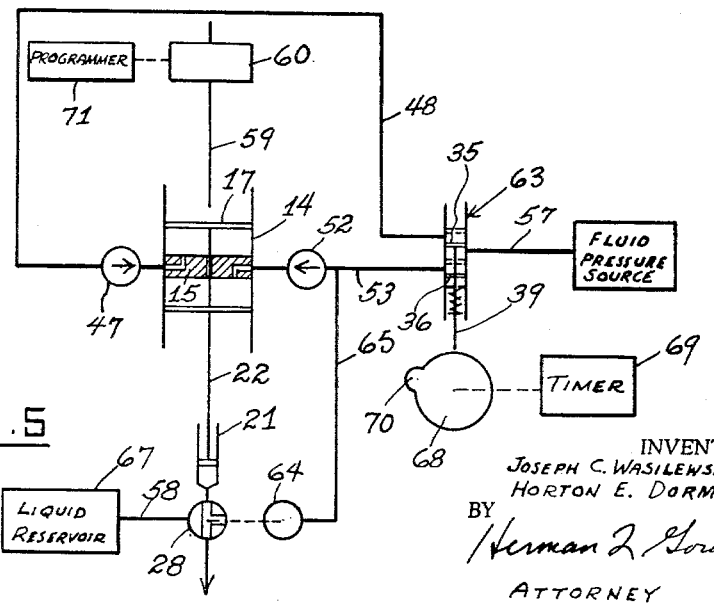
FIGURE 5 is a diagrammatic view of a still further modification of the burette device of the present invention, illustrating means for obtaining timed operation thereof and programmed volumetric adjustment thereof.

In the embodiment illustrated in FIGURE 5, the valve operating rod 39 is biased downwardly into engagement with the periphery of an actuating cam 68 driven by a timing motor 69. Cam 68 is formed with an actuating lug 70 which periodically engages and elevates operating rod 39, providing timed operation of valve 63. The mechanism 60 may be periodically adjusted, as by a programming device 71, to provide programmed adjustment of stop screw 59, to thereby vary the amount of fluid dispensed in accordance with a predetermined program.

Figure 6:
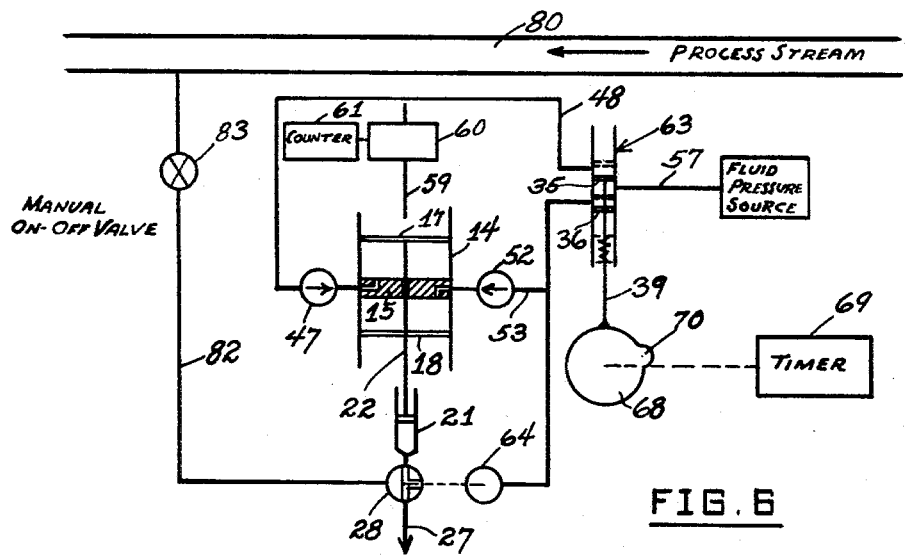
FIGURE 6 is a diagrammatic view of a still further modification of the present invention, illustrating its use for timed sampling or dispensing of processed fluid.

In the embodiment illustrated in FIGURE 6, a burette apparatus similar to that of FIGURE 5, but omitting the programmer 71, is employed to periodically extract predetermined accurately measured sample volumes of processed fluid, either liquid or gas, from a conduit 80 carrying a stream of the processed fluid, and to dispense the predetermined sample volumes for further analysis, for example, to a gas chromatography apparatus, or the like. A fluid supply line 82 provided with a manually operated on-off valve 83 is connected between the conduit 80 and the intake port of the 3-way valve 28. With the valve 83 open, the timing motor 69 operates the apparatus as in FIGURE 5 to periodically collect a predetermined volume of sample fluid in syringe barrel 21 and to thereafter discharge the sample through tube 27 to the analytic apparatus.

Figure 7:
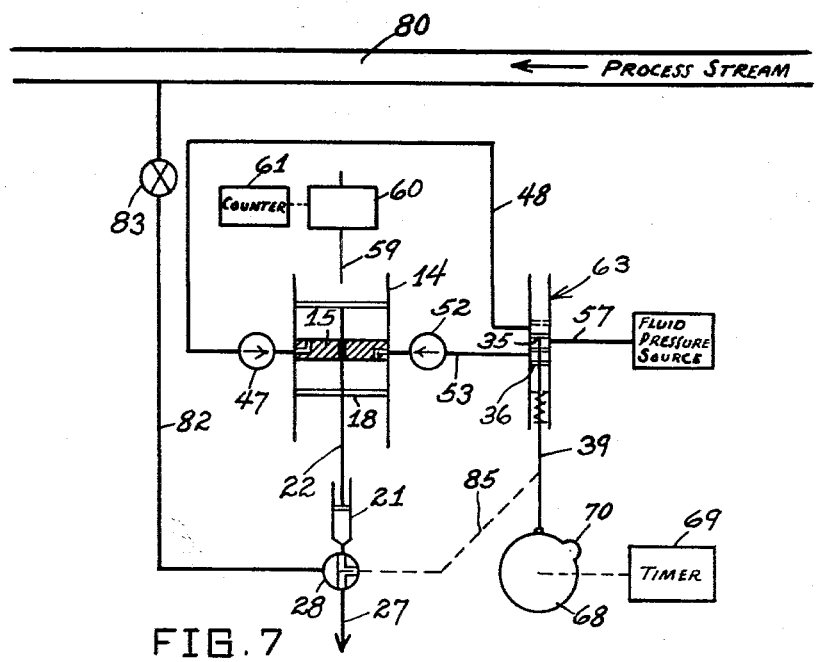
FIGURE 7 is a diagrammatic view illustrating a variation of the arrangement shown in FIGURE 6 and representing a further modification of the present invention.

The embodiment of the invention illustrated in FIGURE 7 is similar to that of FIGURE 6 except that a mechanical linkage, designated diagrammatically at 85, is employed between operating rod 39 and 3-way valve 28 instead of the fluid pressure-operated device 64. The mechanical linkage 85 may be similar to that shown in FIGURES 1, 2 and 3. The operation of the apparatus shown in FIGURE 7 is similar to that of FIGURE 6.

While certain specific embodiments of an improved fluid pressure-operated burette device have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A burette device comprising a syringe barrel, outlet conduit means, a fluid inlet, a three-way valve connected between said barrel and said outlet conduit means and fluid inlet, said three-way valve connecting said fluid inlet to said barrel in a first position and connecting said barrel to said outlet conduit means in a second position, a fluid pressure cylinder axially connected to and aligned with said barrel, an intermediate partition wall in said cylinder having respective fluid passages opening above and below the wall, piston means in said cylinder including respective pistons above and below said partition wall, a piston rod rigidly connected to said pistons and extending slidably and sealingly through said partition wall, a plunger rod in the cylinder rigidly connected to the lower piston and being sealingly and slidably engaged in said barrel to function as a pump, a source of pressure fluid, conduit means connected between said source and said fluid passages and including a control valve operable to alternately admit pressure fluid into said fluid passages to actuate said piston means, said control valve having two positions, admitting pressure fluid into the fluid passage opening above said partition wall in one position and admitting pressure fluid into the fluid passage opening below said partition wall in its other position, means to operate said control valve, means coupling said valve operating means and three-way valve to operate them so that in the first position of said three-way valve the control valve will be in its first-named position and in the second position of said three-way valve the control valve will be in its second-named position, and means to release fluid from the space in the cylinder adjacent each side of the partition wall when pressure fluid is admitted into the space in the cylinder adjacent the other side of said partition wall.

2. A burette device comprising a syringe barrel, outlet conduit means, a fluid inlet, a three-way valve connected between said barrel and said outlet conduit means and fluid inlet, said three-way valve connecting said fluid inlet to said barrel in a first position and connecting said barrel to said outlet conduit means in a second position, a fluid pressure cylinder axially connected to and aligned with said barrel, a partition wall in the intermediate portion of said cylinder having respective fluid passages opening above and below the wall, respective pistons in the cylinder spaced above and below said partition wall, common piston rod means rigidly connected to said pistons and extending slidably and sealingly through said wall a plunger rod connected to the lower piston and sealingly and slidably engaged in said barrel to function as a pump, a source of pressure fluid, means to alternately connect said source to said fluid passages and the spaces immediately above and below said partition means, whereby to actuate said plunger rod in opposite directions, means coupling said last-named means and said three-way valve for simultaneous operation so that pressure fluid will be admitted into the space immediately above said partition wall when said three-way valve is in said first position and into the space immediately below said partition wall when said three-way valve is in said second position, and means to release fluid from the space in the cylinder adjacent each side of the partition wall when pressure fluid is admitted into the space in the cylinder adjacent the other side of said partition wall.

3. A burette device comprising a syringe barrel, a plunger in said barrel acting as a pump, outlet conduit means, a fluid inlet, a three-way valve connected between said barrel, said outlet conduit means and said fluid inlet, said three-way valve connecting said barrel to said fluid inlet in a first position and connecting said barrel to said outlet conduit means in a second position, a fluid pressure cylinder axially connected to and aligned with said barrel, a partition wall in the intermediate portion of said cylinder having respective fluid passages opening above and below the wall, respective pistons in the cylinder spaced above and below said partition wall, means rigidly connecting said pistons and extending slidably and sealingly through said partition wall and drivingly connecting said pistons together, means connecting the lower piston to said plunger, a source of fluid pressure, a two-position selector valve having an inlet port and a pair of outlet ports, respective outlet conduits connected between the outlet ports of the selector valve and the fluid passages in said partition wall, each including a check valve allowing restricted flow in one direction and unrestricted free flow in the opposite direction, conduit means connecting said source to said inlet port, said selector valve in a first position connecting said inlet port to one outlet port and venting the other outlet port to atmosphere, and in a second position connecting said inlet port to said other outlet port and venting said one outlet port to atmosphere, whereby to alternately actuate said plunger in opposite directions, and means coupling said selector valve and three-way valve for simultaneous operation so that said fluid inlet is connected to said barrel when the selector valve is in its first position and the barrel is connected to the outlet conduit means when the selector valve is in its second position, said one outlet port being connected to the partition wall fluid passage leading to the space in the cylinder thereabove and said other outlet port being connected to the partition wall fluid passage leading to the space in the cylinder therebelow.

4. The structure of claim 3, and a depending adjustable stop member mounted in the cylinder and being engageable with the upper piston to limit upward movement thereof, and an indicating counter operatively connected to said adjustable stop member to provide an indication in accordance with the volume of fluid drawn into the barrel.

5. A burette device comprising a syringe barrel, a plunger in said barrel acting as a pump, outlet conduit means, a fluid inlet, a three-way valve connected between said barrel, said outlet conduit means and said fluid inlet, said three-way valve connecting said barrel to said fluid inlet in a first position and connecting said barrel to said outlet conduit means in a second position, a fluid pressure cylinder axially connected to and aligned with said barrel, a partition wall in the intermediate portion of said cylinder having respective fluid passages opening above and below the wall, respective pistons in the cylinder spaced above and below said partition wall, means rigidly connecting said pistons and extending slidably and sealingly through said partition wall and drivingly connecting said pistons together, means connecting the lower piston to said plunger, a source of fluid pressure, a two-position selector valve having an inlet port and a pair of outlet ports, respective outlet conduits connected between the outlet ports of the selector valve and the fluid passages in said partition wall, each including a check valve allowing restricted flow in one direction and unrestricted free flow in the opposite direction, conduit means connecting said source to said inlet port, said selector valve being provided with a rectilinearly movable operating rod, a pair of valve pistons connected to said operating rod, said last-named pistons being spaced to communicatively connect said inlet port to one outlet port in a first position of said operating rod and to communicatively connect said inlet port to the other outlet port in a second position of said operating rod, said selector valve having means to vent said other outlet port to atmosphere in said first position of the rod and to vent said one outlet port to atmohphere in said second position of the rod, whereby to alternately actuate said plunger in opposite directions in said first and second positions of the rod, and means coupling said operating rod and three-way valve for simultaneous operation so that said fluid inlet is connected to said barrel when the operating rod is in said first position thereof and the barrel is connected to the outlet conduit means when the operating rod is in said second position thereof, said one outlet port being connected to the partition wall fluid passage leading to the space in the cylinder thereabove and said other outlet port being connected to the partition wall fluid passage leading to the space in the cylinder therebelow.

6. A burette device comprising a syringe barrel, a plunger in said barrel acting as a pump, outlet conduit means, a fluid inlet, a three-way valve connected between said barrel, said outlet conduit means and said fluid inlet, said three-way valve connecting said barrel to said fluid inlet in a first position and connecting said barrel to said outlet conduit means in a second position, a fluid pressure cylinder axially connected to and aligned with said barrel, a partition wall in the intermediate portion of said cylinder having respective fluid passages opening above and below the wall, respective pistons in the cylinder spaced above and below said partition wall, means rigidly connecting said pistons and extending slidably and sealingly through said partition wall and drivingly connecting said pistons together, means connecting the lower piston to said plunger, a source of fluid pressure, a two-position selector valve having an inlet port and a pair of outlet ports, respective outlet conduits connected between the outlet ports of the selector valve and the fluid passages in said partition wall, each including a check valve allowing restricted flow in one direction and unrestricted free flow in the opposite direction, conduit means connecting said source to said inlet port, said selector valve being provided with a rectilinearly movable operating rod, a pair of valve pistons connected to said operating rod, said last-named pistons being spaced to communicatively connect said inlet port to one outlet port in a first position of said operating rod and to communicatively connect said inlet port to the other outlet port in a second position of said operating rod, said selector valve having means to vent said other outlet port to atmosphere in said first position of the rod and to vent said one outlet port to atmosphere in said second position of the rod, whereby to alternately actuate said plunger in opposite directions in said first and second positions of the rod, means coupling said operating rod and three-way valve for simultaneous operation so that said fluid inlet is connected to said barrel when the operating rod is in said first position thereof and the barrel is connected to the outlet conduit means when the operating rod is in said second position thereof, said one outlet port being connected to the partition wall fluid passage leading to the space in the cylinder thereabove and said other outlet port being connected to the partition wall fluid passage leading to the space in the cylinder therebelow, a depending adjustable stop member mounted in the cylinder and being engageable with the upper of said first-named pistons to limit upward movement of the plunger, and means including an indicating counter to adjust the position of said stop member.

7. The structure of claim 5, and wherein said coupling means comprises a cam mechanically connected to said three-way valve and a follower element on said operating rod drivingly engaged by said cam.

8. The structure of claim 7, and a timing motor drivingly coupled to said cam.

9. The structure of claim 5, and wherein said coupling means comprises a fluid pressure-operated actuator drivingly connected to said three-way valve, and conduit means connecting said actuator to one of said outlet ports.

10. The structure of claim 9, and a rotary cam drivingly engaged with said operating rod.

11. The structure of claim 10, and a timing motor drivingly connected to said cam.

12. The structure of claim 6, and programming means operatively connected to said stop member adjusting means.

13. A burette device comprising a syringe barrel, outlet conduit means, a fluid inlet, a three-way valve connected between said barrel and said outlet conduit means and fluid inlet, said three-way valve connecting said fluid inlet to said barrel in a first position and connecting said barrel to said outlet conduit means in a second position, a fluid pressure cylinder axially connected to and aligned with said barrel, including respective pistons above and below said partition wall, a piston rod rigidly connected to said pistons and extending slidably and sealingly through said partition wall, a plunger rod in the cylinder rigidly connected to the lower piston and being sealingly and slidably engaged in said barrel, a source of pressure fluid, conduit means connected between said source and said fluid passages, a control valve in said last-named conduit means operable to alternately admit pressure fluid into said fluid passages to actuate said piston means, means to release fluid from the space in the cylinder adjacent each side of the partition wall when pressure fluid is admitted into the space in the cylinder adjacent the other side of said partition wall, and means operatively coupling the control valve to the three-way valve so that pressure fluid will be admitted into the space immediately above the partition wall when the three-way valve is in said first position and will be admitted into the space immediately below said partition wall when the three-way valve is in said second position.

References Cited by the Examiner
UNITED STATES PATENTS

| | | | |
|---|---|---|---|
| 691,343 | 1/02 | Abenroth | 103—50 X |
| 886,379 | 5/08 | Laursen | 103—50 |
| 2,757,839 | 8/56 | Carew | 222—333 X |
| 2,814,422 | 11/57 | Mercier | 200—438 X |

FOREIGN PATENTS

| | | |
|---|---|---|
| 87,672 | 3/58 | Netherlands. |

RAPHAEL M. LUPO, *Primary Examiner.*